Jan. 16, 1962 G. H. BINGHAM, JR., ET AL 3,016,569
VULCANIZING MACHINE WITH SPRING RELEASE
Filed April 13, 1960 2 Sheets-Sheet 1

INVENTORS
George H. Bingham, Jr.
Otto V. Olsson
Robert Cushman & Crews
ATT'YS.

Jan. 16, 1962 G. H. BINGHAM, JR., ET AL 3,016,569
VULCANIZING MACHINE WITH SPRING RELEASE
Filed April 13, 1960 2 Sheets-Sheet 2
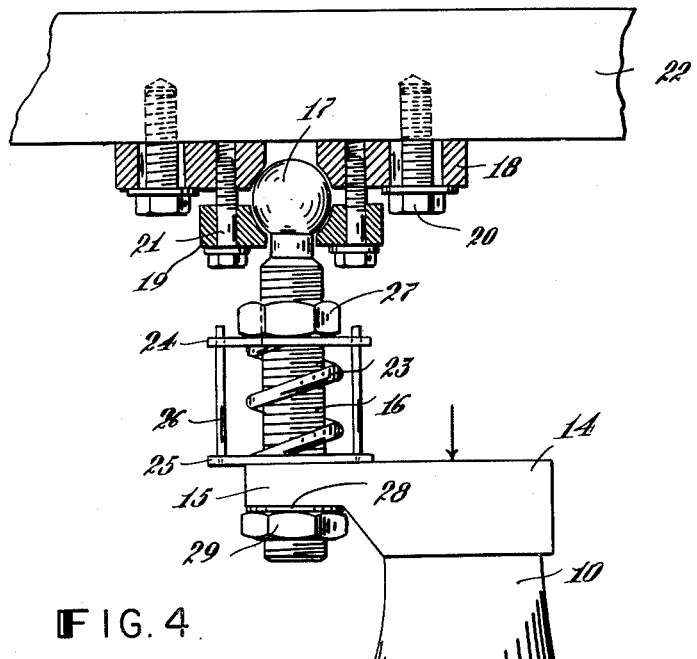
FIG. 4.
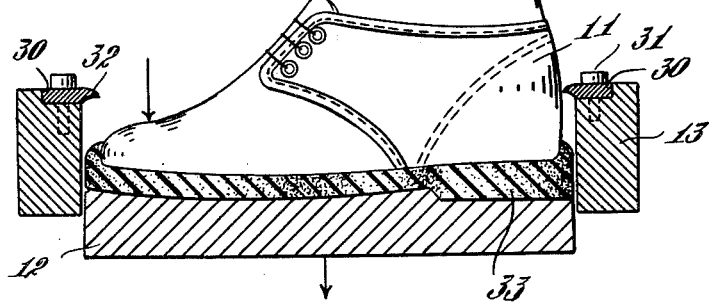
INVENTORS
George H. Bingham, Jr.
Otto V. Olsson
ATT'YS.

3,016,569
VULCANIZING MACHINE WITH
SPRING RELEASE
George H. Bingham, Jr., Westminster, and Otto Y. Olsson, Taneytown, Md., assignors to Cambridge Rubber Company, Taneytown, Md., a corporation of Maryland
Filed Apr. 13, 1960, Ser. No. 22,048
4 Claims. (Cl. 18—17)

This invention relates to the manufacture of footwear and more particularly to methods and apparatus for making rubber soled shoes.

In accordance with one method of making footwear having outsoles of rubber or the like, there is used a sole molding apparatus comprising a rigidly supported last, a bottom mold which is movable up and down and a so-called "ring mold" which extends all the way around the shoe sole defining its lateral edge and which comprises two or more parts which are relatively movable to expand and contract horizontally. The ring mold is provided with an overhanging inner edge which is adapted to form an integral foxing strip in the molded outersole.

In forming and attaching the outersole to a shoe, the shoe assembly is secured to the last and the latter is positioned so that the lower part of the lasted shoe is within the ring mold, with the shoe bottom below the inner edge of the ring mold and a mass of vulcanizable rubber dough or similar compound is placed upon the bottom member while it is in lowered position. The ring mold whose parts are supported for horizontal movement but which are not movable vertically, is then contracted, the overhanging edge substantially embracing the lasted shoe. The bottom mold member is now moved upwardly a sufficient amount to compress the rubber dough and to give it the desired shape. The parts are then kept at a suitable temperature to vulcanize or cure the rubber and at the same time to cause it to adhere to the innersole of the shoe. The mold ring is then separated or expanded, the bottom mold member moved downwardly, and the shoe removed.

In this prior method, the overhanging edge of the ring mold is dragged across the foxing strip of the outersole as the ring mold is expanded to permit removal of the completed shoe. This is particularly true since this overhanging edge is normally undercut, that is, has an innermost edge which dips below the uppermost edge of the foxing strip. This operation of expanding the ring mold to release the shoe frequently results in the marring or tearing of the foxing strip and it is the principal object of this invention to provide a method and apparatus to avoid this difficulty.

This invention will be better understood by reference to the following detailed description of a specific embodiment of the invention and by reference to the accompanying drawings wherein:

FIG. 4 is a view similar to FIG. 1, but showing the last in downward position.

Figure 1:
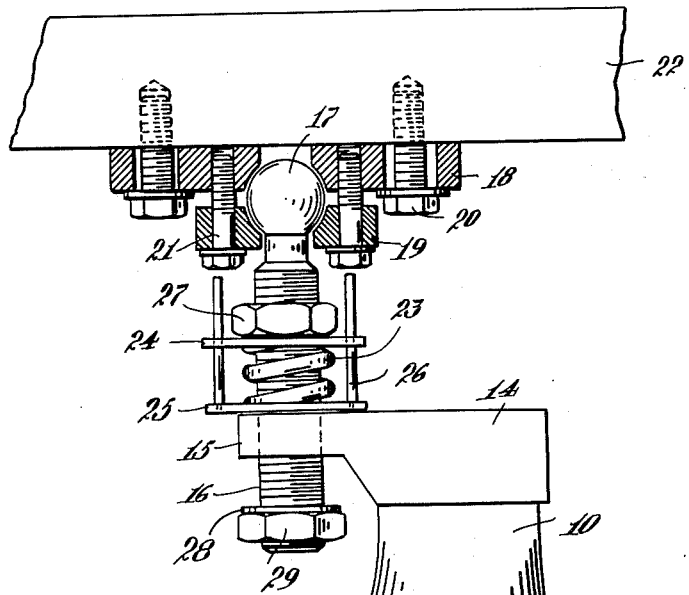
FIG. 1 is a side view of molding apparatus according to this invention, with parts in section.

The apparatus illustrated comprises a last 10 having thereon a lasted shoe assembly 11 which is to be provided with a rubber sole, a mold having a bottom member 12 movable up and down and a ring mold 13 together with position means for the last 10 to be hereinafter described.

The last 10 is provided with an upper portion 14 having a flange 15 which has a central bore for receiving a bolt 16. The bolt 16 is threaded and terminates in its upper end in a ball 17 which is clamped between retaining plates 18 and 19. Retaining plates 18 and 19 are secured by means of screws 20 and 21 respectively to an upper frame member 22.

A compression spring 23 encircles the bolt 16 between retaining plates 24 and 25. Retaining plate 25 abuts against the upper portion of flange 15 and has guide pins 26 secured thereto which engage corresponding holes in retaining plate 24 to guide and maintain the plates parallel as the spring operates. Upper retaining plate 24 abuts against nut 27 to limit its upward movement, while the lower surface of flange 15 abuts against the washer 28 held in place by a nut 29 thereby to limit downward movement of the last.

Figure 2:
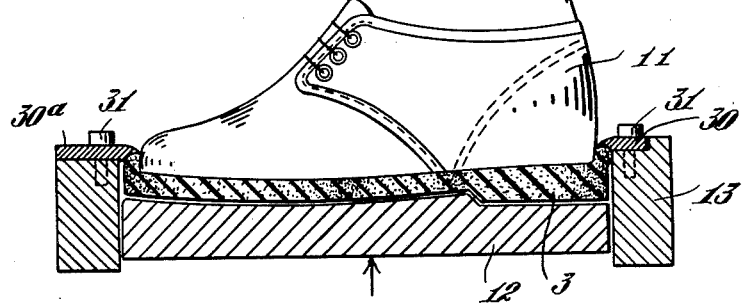
FIG. 2 is a plan view of one part of a slit ring mold on a slightly reduced scale.
Figure 2:
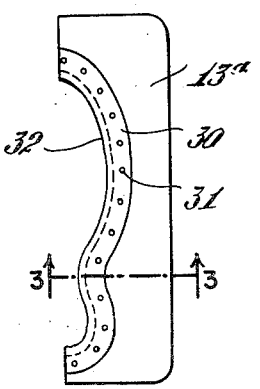
Figure 3:
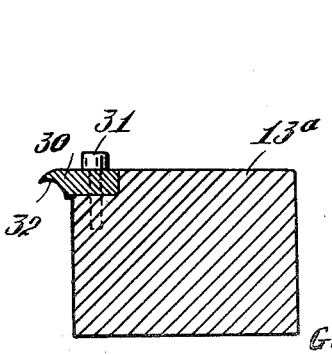
FIG. 3 is an enlarged section taken on the line 3—3 of FIG. 2.

Ring mold 13 is longitudinally split to form substantially mirror halves, one of which, 13a, is shown in FIGS. 2 and 3. These split halves are actuated by conventional means (not shown) for contraction and expansion to free the shoe after the outersole is molded. The ring mold is provided with an insert 30 which is secured to the ring mold by screws 31 and which has an overhanging inner edge 32 adapted to form an integral foxing strip on the molded outersole. If desired, insert 30 can be replaced by a flat abutment plate 30a (FIG. 1).

The bottom member of the mold 12 is movable up and down as illustrated in FIGS. 1 and 4 respectively. The split halves of ring mold 30 are relatively movable to expand and contract the ring mold about the bottom member 12. While the ring mold illustrated comprises two halves, it is obvious that the ring mold could be made in additional parts if desired.

In operation, the bottom member 12 of the mold is removed from the ring mold, a mass 33 of vulcanizable rubber is placed upon the bottom member and the latter is then moved upwardly into the ring mold which is thereupon contracted to define the lateral edges of the outsole and then the bottom member 12 is moved upwardly to confine and mold the rubber mass to the desired shape. Heat is then applied for a sufficient period of time to complete the vulcanization or cure of the sole material.

The last 10 is so positioned above the bottom member 12 that when the latter is moved into its upward position the last also moves upwardly thereby compressing the spring 23. After the outersole is completed, the bottom member 12 is moved downwardly, the spring 23 forcing the last downwardly away from the overhanging edge 32 (FIG. 4). The ring mold is then expanded and the completed shoe removed from the last, the bottom member 12, of course, having been moved sufficiently below the last 10 to facilitate removal of the shoe.

Since spring 23 moves the shoe 11 downwardly before the ring mold 13 is expanded, the foxing strip at the upper lateral edge of the outersole is withdrawn from contact from the overhanging edge 32 so that when the latter is expanded it does not damage the foxing strip.

While references have been herein made to outersoles of rubber, it should be understood that the invention is equally applicable to other suitable elastomeric sole material which can be molded and then cured or hardened.

It should be further understood that the foregoing description is for the purpose of illustration only and that the invention includes all modifications falling within the scope of the appended claims.

We claim:

1. Apparatus for use in providing a lasted article of footwear with a molded outsole of elastomeric material, and a foxing strip integral with the outer sole by the use of a mold which comprises a multi-part ring defining the side wall of a mold cavity and whose parts are movable horizontally to expand or contract the mold cavity, a bottom wall member which is movable vertically relatively to the ring and which, during the molding operation, is moved upwardly within the ring, thereby to compress moldable sole-forming material within the cavity, and a last, with the lasted shoe therein, defines the top wall of the mold cavity during the molding operation, the mold ring having a peripheral overhanging inner edge which defines the upper edge of the desired foxing strip and wherein, during the molding operation, the ring mold is contracted about the lower portion of the lasted shoe and the bottom of the lasted shoe is below the plane defined by said inner edge of the mold ring, in combination, means operative to guide the last, with the lasted shoe thereon, for vertical movement relatively to the mold ring in response to upward pressure exerted by the moldable material during the molding operation, and means operative automatically to move the last downwardly when the molding pressure is released, thereby to separate the molded material from said overhanging lip prior to the expansion of the mold ring.

2. Apparatus according to claim 1, for use in providing a shoe with an outer sole of elastomeric material, wherein the means for guiding the last for vertical movement relatively to the ring mold comprises a normally stationary, elongate guide member with which the last has sliding engagement and the means for moving the last downwardly, when the molding pressure is released, comprises a spring.

3. Apparatus according to claim 2, wherein the means for moving the last downwardly comprises a helical compression spring interposed between a normally stationery part of the last-positioning means and the last, and so arranged that it is compressed by upward movement of the bottom mold member in disposing the latter within the mold cavity.

4. Apparatus according to claim 2, wherein the last comprises a part having a vertical bore within which said vertically elongate guide member is slidably received and having longitudinally spaced stops to limit relative vertical motion of the last and the guide member, and the means for moving the last downwardly comprises a compression spring embracing said guide member, with one end abuting the upper stop and the other abuting the last, the spring being so arranged that it is compressed by the upward movement of the bottom member as the latter is raised to dispose it within the ring mold.

References Cited in the file of this patent
UNITED STATES PATENTS

| | | |
|---|---|---|
| 896,224 | Mason | Aug. 18, 1908 |
| 1,994,278 | Halsall et al. | Mar. 12, 1935 |

FOREIGN PATENTS

| | | |
|---|---|---|
| 554,530 | Italy | Jan. 12, 1957 |